(12) United States Patent
Jaeger

(10) Patent No.: US 10,767,696 B2
(45) Date of Patent: Sep. 8, 2020

(54) BEARING COMPONENT AND METHOD OF MAKING AND USING THE SAME

(71) Applicant: SAINT-GOBAIN PERFORMANCE PLASTICS PAMPUS GMBH, Willich (DE)

(72) Inventor: Hans-Juergen Jaeger, Huerth (DE)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 0 days.

(21) Appl. No.: 16/233,396

(22) Filed: Dec. 27, 2018

(65) Prior Publication Data

US 2019/0203771 A1    Jul. 4, 2019

Related U.S. Application Data

(60) Provisional application No. 62/611,637, filed on Dec. 29, 2017.

(51) Int. Cl.
| | |
|---|---|
| *F16C 33/20* | (2006.01) |
| *F16C 33/28* | (2006.01) |
| *F16C 17/10* | (2006.01) |
| *B32B 15/02* | (2006.01) |
| *B32B 15/14* | (2006.01) |

(52) U.S. Cl.
CPC ............ *F16C 33/201* (2013.01); *B32B 15/02* (2013.01); *B32B 15/14* (2013.01); *F16C 17/10* (2013.01); *F16C 33/205* (2013.01); *F16C 33/206* (2013.01); *F16C 33/208* (2013.01); *F16C 33/28* (2013.01); *F16C 2208/02* (2013.01); *F16C 2208/32* (2013.01); *F16C 2240/40* (2013.01); *F16C 2240/60* (2013.01)

(58) Field of Classification Search
CPC .... F16C 33/201; F16C 33/205; F16C 33/206; F16C 33/208; F16C 33/28; F16C 17/22; F16C 17/14; F16C 2208/02; F16C 2208/32; F16C 2240/40; F16C 2240/46; F16C 2240/60; B32B 15/02; B32B 15/14; B32B 15/18; E04B 1/36
USPC ................ 384/275–276, 284, 295, 300, 282; 198/841, 848; 428/604, 608; 29/898.041, 898.054, 898.058
See application file for complete search history.

(56) References Cited

U.S. PATENT DOCUMENTS

| | | |
|---|---|---|
| 157,124 A | 11/1874 | Glidden |
| 332,252 A | 12/1885 | Haish |
| 2,423,547 A | 7/1947 | Behlen |

(Continued)

FOREIGN PATENT DOCUMENTS

| | | | |
|---|---|---|---|
| DE | 1947367 A1 * | 4/1970 | ............. H01B 9/024 |
| DE | 2205008 A1 | 8/1973 | |

(Continued)

*Primary Examiner* — Marcus Charles
(74) *Attorney, Agent, or Firm* — Abel Schillinger, LLP; Chi Suk Kim

(57) ABSTRACT

A bearing component including a substrate; a sliding layer overlying the substrate; and a metal mesh comprising filaments embedded in the sliding layer, the metal mesh having a woven structure such that the filaments overlap each other at intersections, where a plurality of intersections include a first filament overlying a second filament, the first filament being mechanically so as to interlock with the second filament.

20 Claims, 8 Drawing Sheets

(56) References Cited

U.S. PATENT DOCUMENTS

| | | | |
|---|---|---|---|
| 2,925,650 A | 2/1960 | Pall | |
| 3,087,233 A | 4/1963 | Turnbull | |
| 3,143,150 A | 8/1964 | Buchanan | |
| 3,254,968 A | 6/1966 | Bender | |
| 3,266,130 A | 8/1966 | Glaze | |
| 3,327,866 A | 6/1967 | Pall et al. | |
| 3,604,180 A * | 9/1971 | Wood | E04C 5/06 52/649.3 |
| 3,899,227 A | 8/1975 | Harig | |
| 4,259,385 A * | 3/1981 | Keller | B21D 31/043 428/135 |
| 4,624,887 A * | 11/1986 | Bickle | F16C 33/201 384/7 |
| 4,754,871 A * | 7/1988 | Gustafson | B65G 15/54 198/848 |
| 5,188,813 A | 2/1993 | Fairey et al. | |
| 5,229,198 A | 7/1993 | Schroeder | |
| 5,300,366 A * | 4/1994 | Nakamaru | C08K 3/04 428/549 |
| 5,732,322 A | 3/1998 | Nakamaru et al. | |
| 5,971,617 A * | 10/1999 | Woelki | F16C 33/201 384/295 |
| 6,464,396 B1 * | 10/2002 | Schubert | F16C 33/14 384/273 |
| 6,548,188 B1 * | 4/2003 | Yanase | F16C 33/201 384/300 |
| 7,204,461 B2 | 4/2007 | John et al. | |
| 8,231,276 B2 * | 7/2012 | Than Trong | F16C 33/201 29/898.041 |
| 2002/0092737 A1 * | 7/2002 | Messick, Jr. | B65G 15/54 198/850 |
| 2010/0047612 A1 * | 2/2010 | Kugo | B22F 7/08 428/613 |
| 2011/0049834 A1 | 3/2011 | Natu | |
| 2012/0240350 A1 * | 9/2012 | Natu | E05D 5/14 16/2.2 |
| 2013/0062469 A1 | 3/2013 | Cengiz et al. | |
| 2014/0044385 A1 * | 2/2014 | Andelkovski | B32B 15/08 384/276 |
| 2014/0153852 A1 * | 6/2014 | Long | F03B 11/06 384/129 |
| 2015/0093066 A1 | 4/2015 | Speicher et al. | |
| 2015/0114549 A1 | 4/2015 | Slayne et al. | |

FOREIGN PATENT DOCUMENTS

| | | | |
|---|---|---|---|
| DE | 3018974 A1 | 11/1981 | |
| DE | 102014110339 A1 | 1/2016 | |
| WO | WO-2005105431 A1 * | 11/2005 | F16C 33/201 |

* cited by examiner

BEARING COMPONENT AND METHOD OF MAKING AND USING THE SAME

CROSS-REFERENCE TO RELATED APPLICATION(S)

This application claims priority under 35 U.S.C. § 119(e) to U.S. Patent Application No. 62/611,637 entitled "BEARING COMPONENT AND METHOD OF MAKING AND USING THE SAME," by Hans-Juergen JAEGER, filed Dec. 29, 2017, which is assigned to the current assignee hereof and incorporated herein by reference in its entirety.

FIELD OF THE DISCLOSURE

The disclosure relates to bearing components and methods of making and using the same.

BACKGROUND

Bearing assemblies are used in a wide variety of applications including radial applications where relative movement is managed between inner and outer components such as a shaft and a housing, such as a hinge assembly. They can take numerous forms including ball bearings containing bearing balls, roller bearings including needle, journal bearings, plain bearings, and tapered roller bearings.

Typically, bearing assemblies may include bearing components that include metals. However, in the metal consuming industries, such as automotive industries, may exhibit undesired corrosion characteristics such as (i) uniform corrosion, (ii) crevice corrosion, (iii) pitting corrosion, (iv) cosmetic corrosion, and (v) galvanic corrosion. Further, some bearing components exhibit undesired stiffness and less stable torque characteristics. Also, in some bearing components that use metal meshes, there exists a creation of burrs during manufacture that amplify undesired characteristics.

As such, there exists a need for bearing components and bearing assemblies that have improved properties and performance.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENTS

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item. Also, the use of "about" or "substantially" is employed to convey spatial or numerical relationships that describe any value or relationship that does not depart from the scope of the invention.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing assembly and tolerance ring arts.

Figure 1A:
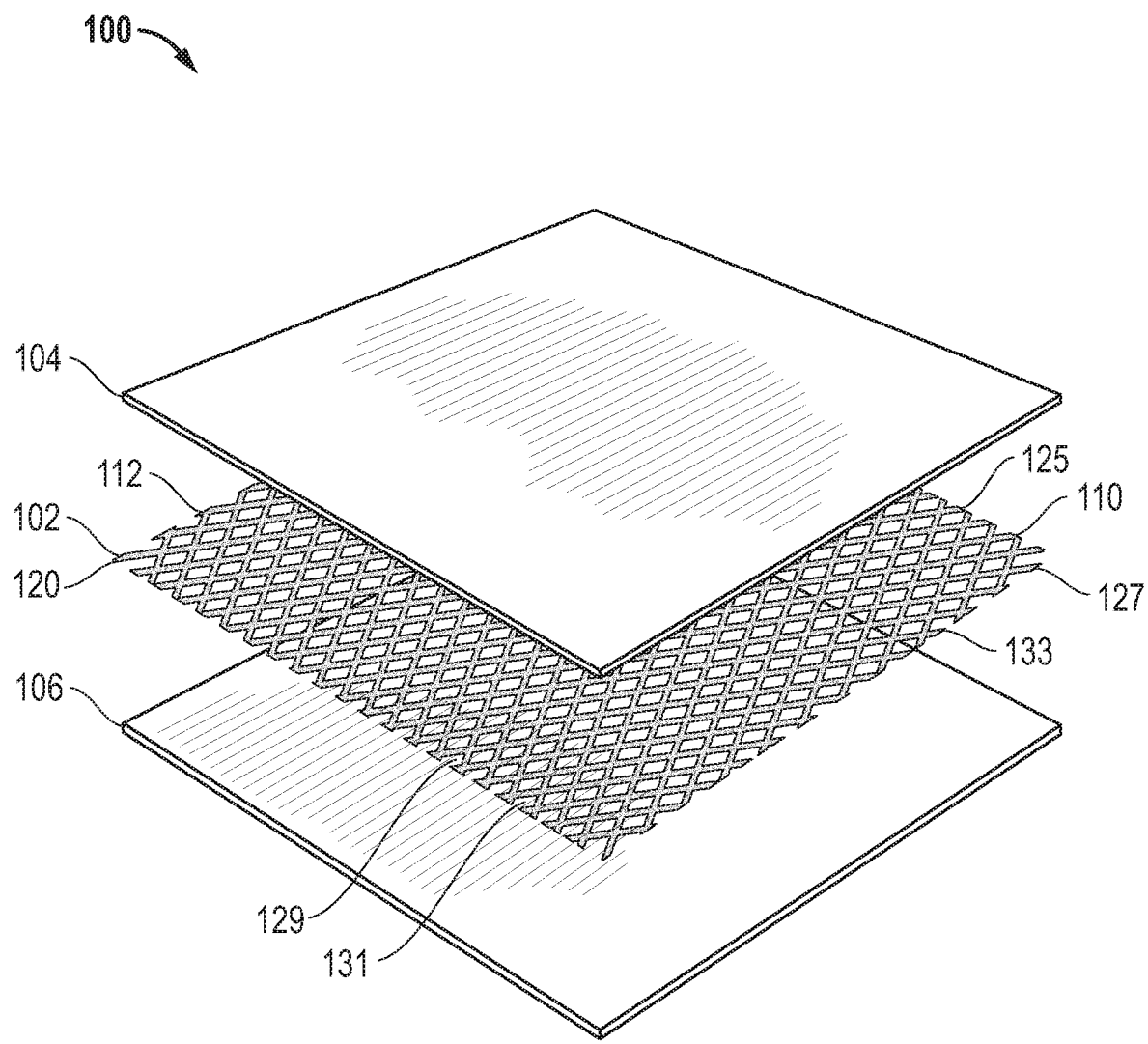
FIG. 1A includes an illustration of a bearing component according to a number of embodiments.

FIG. 1A depicts an exemplary bearing component 100. As shown in FIG. 1, the bearing component 100 may include a metal mesh 102. As shown in FIG. 1A, the bearing component 100 may include a sliding layer 104. In a number of embodiments, the sliding layer 104 may overlie the metal mesh 102. In a number of embodiments, the sliding layer 104 may underlie the metal mesh 102. In some embodiments, the bearing component 100 can optionally include a substrate 106. In one embodiment, the substrate can be a metal containing substrate, such as a steel substrate.

The bearing component 100 may be a laminate. In a number of embodiments, the bearing component 100 may be a laminate (of the metal mesh 102, and the sliding layer 104, and optionally, the substrate 106).

Referring again to FIG. 1A, in an embodiment, the metal mesh 102 includes a plurality of interconnected filaments 110. The filaments 110 may be a plurality of wires. In a number of embodiments, at least one filament 110 may have a filament thickness, $T_{F1}$, of no less than 0.1 mm, such as no less than 0.5 mm, such as no less than 0.75 mm, such as no less than 1 mm, such as no less than 1.5 mm, such as no less than 2 mm, such as no less than 5 mm. In a number of embodiments, at least one filament 110 may have a filament thickness $T_F$, of no greater than 10 mm, such as no greater than 7.5 mm, such as no greater than 5 mm, such as no greater than 2.5 mm, such as no greater than 1 mm, or such as no greater than 0.5 mm. In a number of embodiments, at least one filament 110 may have a filament thickness $T_F$, between about 0.1 and about 5 mm. The filaments 110 can define at least one aperture 112. The aperture 112 may extend through the thickness $T_{IC}$ of the metal mesh 102. In a number of embodiments, the apertures 112 may be trapezoidal when viewed normal to a plane formed by the mesh 102. In other embodiments, the apertures 112 may have other polygonal shapes. For example, the apertures 112 may have a shape, when viewed normal to the plane formed by the mesh 102, selected from the following shapes: a triangle, a quadrilateral, a square, a circle, an oval, an ellipse, a pentagon, a hexagon, a heptagon, an octagon, a nonagon, a decagon, a hendecagon, or a dodecagon.

Figure 1B:
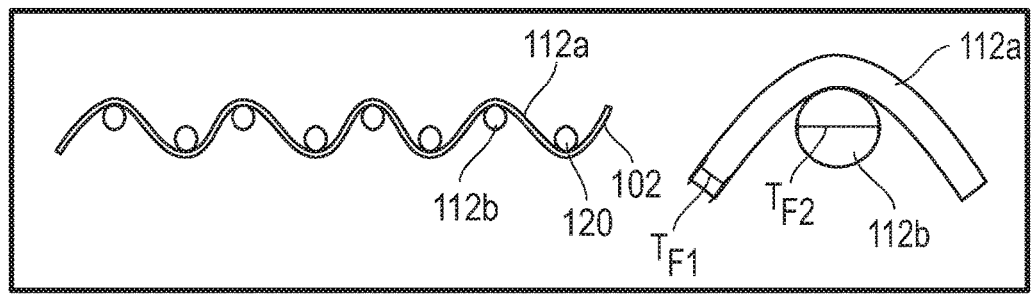
FIG. 1B includes an illustration of a cross-section of a metal mesh of a bearing component according to a number of embodiments.
Figure 1C:
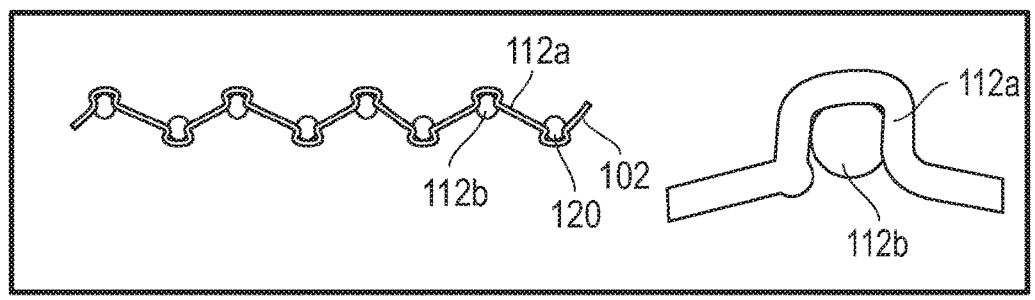
FIG. 1C includes an illustration of a cross-section of a metal mesh of a bearing component according to a number of embodiments.

In a number of embodiments, as shown in FIG. 1B-C, the metal mesh 102 made of filaments 110 may include a woven mesh having a first filament 112a and a second filament 112b. In one embodiment, the first filament 112a and the second filament 112b can have the same thickness. In another embodiment, the first filament 112a has a thickness $T_{F1}$ and the second filament 112b has a thickness $T_{F2}$ and the ratio of $T_{F2}/T_{F1}$ can be at least about 1.1, such as at least about 1.5, at least about 2, at least about 2.5, or even at least about 3.0. In another embodiment, the ratio is not greater than about 5.0.

Figure 1D:
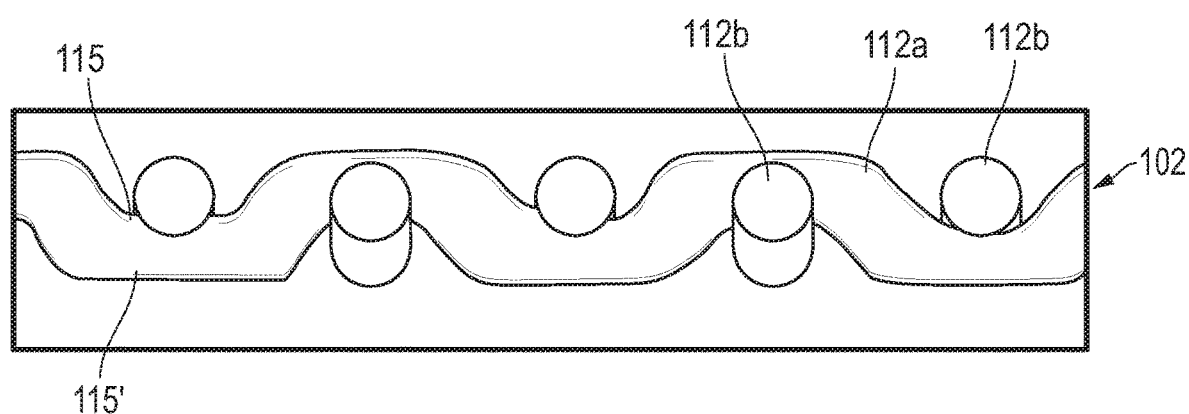
FIG. 1D includes an illustration of a cross-section of a metal mesh of a bearing component according to a number of embodiments.

In a number of embodiments, as shown in FIG. 1B-D, the metal mesh 102 may have a woven structure. In a number of embodiments, the filaments 112a, 112b of the metal mesh 102 may be woven to include a plurality of intersections 120. In a number of embodiments, as shown in FIGS. 1B, 1C, and 8, the intersections 120 may form the overlap of the metal mesh 102 where the first filament 112a overlies the second filament 112b. In a number of embodiments, at least one intersection 120 may be an intersection where the first filament 112a may be mechanically deformed so as to wrap around the second filament 112b and interlock therewith. In a number of embodiments, the first filament 112a may be mechanically deformed so as to wrap around the second filament 112b and interlock therewith by at least 90°, such as at least 120°, at least 150°, at least 180°, at least 210°, at least 240°, at least 270°, or at least 300°.

As stated above, at least one of the filaments 112a, 112b forming the mesh 102 may be mechanically deformed. This mechanical deformation can be done by rolling, such as cold rolling. Other deformation processes may be suitable as well, such as indenting, stretching, expanding, recessing, deep drawing, flange forming, bending, or shearing (or any of the sub-processes used within). In a number of particular embodiments, cold rolling may be used to form the mechanical deformation of the filaments 112a, 112b to provide the intersections 120 where the first filament 112a interlocks with the second filament 112b.

In a number of embodiments, as shown in FIG. 1D, the mechanical deformation of at least one of the filaments 112a, 112b forming the mesh 102 may result in at least one flattened section 115 in at least one of the filaments 112a, 112b. In a number of embodiments, the mechanical deformation of at least one of the filaments 112a, 112b forming the mesh 102 may result in the wire taking a less sinusoidal shape when viewed in a cross-section in a view perpendicular to the plane of the mesh 102, as shown in FIG. 1D. In a number of embodiments, the at least one flattened section 115 may include at two flattened sections 115, 115' that may be parallel or substantially parallel to each other at the at least one intersection 120. In a number of embodiments, the at least one flattened section 115 may include at two flattened sections 115, 115' that may be parallel or substantially parallel to each other at each intersection 120. As used herein, "substantially parallel" refers to a relative angle as formed between two lines or planes of no greater than 10°, such as no greater than 5°, or even no greater than 1°. As used herein, "parallel" refers to a relative angle as formed between two lines or planes of no greater than 0.1°. In an embodiment, the metal mesh 102 may include a plurality of first filaments 112a and a plurality of second filaments 112b extending along first and second directions, respectively. In an embodiment, the filaments 112a, 112b extending along one of the directions, such as filaments 112a, may be subject to mechanical deformation at intersections 120, such as a majority of the intersections 120. In an embodiment, deformation may be associated with the direction rolling of the metal mesh 102 and at least 70% or at least 80% of the intersections 120 have associated deformation. Filaments extending in a second direction, such as filaments 112b, may have limited or no perceivable deformation.

Further, the metal mesh 102 may be an expanded mesh. Expanded mesh may be manufactured by several different processes. Prior to shaping, the expanded mesh may be a sheet of material. The sheet of material may have a uniform thickness defining opposing major surfaces. The sheet of material may be continuous, e.g., devoid of holes or openings therethrough. As understood by skilled artisans, the sheet of material may be shaped by at least one of several methods. For example, a plurality of apertures may be stamped into the sheet. Stamping may either involve material removal or the creation of slits within the sheet without significant material removal. In an embodiment, the apertures may be equally spaced apart from one another. In another embodiment, the apertures may be spaced apart from one another at different spatial intervals.

In certain embodiments, the sheet may be expanded, or stretched, during stamping. For example, a serrated press may reciprocate between open and closed positions, forming the apertures and simultaneously creating an undulating surface profile of the sheet. Alternatively, the sheet may be stamped to form the apertures in a first step and then be expanded in a second step. Expansion of the sheet can occur in a single direction or in a bi- or other multi-directional manner. For example, in an embodiment, the sheet may be expanded in opposing directions, e.g., a first direction and a second direction offset from the first direction by 180°. In another embodiment, the sheet may be bi-directionally expanded, e.g., expanded in a first, second, third, and fourth directions. The first and third directions may be opposite one another and the second and fourth directions may be opposite one another. More particularly, each of the first and third directions may be offset by 90° from each of the second and fourth directions.

In an embodiment, the expanded mesh can have a thickness that may be at least 101% a thickness of the pre-expanded mesh, such as at least 101% the thickness of the pre-expanded mesh, at least 102% the thickness of the pre-expanded mesh, at least 103% the thickness of the pre-expanded mesh, at least 104% the thickness of the pre-expanded mesh, at least 105% the thickness of the pre-expanded mesh, at least 110% the thickness of the pre-expanded mesh, at least 115% the thickness of the pre-expanded mesh, at least 120% the thickness of the pre-expanded mesh, at least 125% the thickness of the pre-expanded mesh.

In a number of embodiments, the expanded mesh may be not woven but prepared from a sheet having planar major surfaces. The expanded sheets may have a planarity of at least one major surface that is maintained after stretching the metal and creating a metal grate. Such planarity results in an embedded expanded metal sheet with one major surface of the expanded sheet remaining parallel to one major surface of the sliding layer or parallel to the surface of a substrate 106. In one embodiment, the distance between the major surface of the expanded mesh and the closest surface of the sliding layer 104 can be at least 0.001 mm, such as at least 0.005 mm, at least 0.01 mm, at least 0.05 mm, at least 0.1 mm, or at least 0.2 mm. In another embodiment, the distance cannot be greater than 1 mm, such as not greater than 0.9 mm, not greater than 0.8 mm, not greater than 0.7 mm, not greater than 0.6 mm, not greater than 0.5 mm, or not greater than 0.3 mm. In one embodiment, the thickness ranges from 0.001 mm to 0.5 mm, such as from 0.005 mm to 0.3 mm, or 0.01 mm to 0.2 mm. The stretched metal can have a thickness of at least about 0.1 mm, such as at least about 0.2 mm, at least about 0.3 mm, at least about 0.4 mm, at least about 0.5 mm, or at least about 0.6 mm. In another embodiment the stretched metal thickness may not be greater than about 1.0, such as not greater than about 0.9 mm, not greater than about 0.8 mm, not greater than about 0.6 mm, not greater than about 0.5 mm, or not greater than about 0.4 mm.

In a number of embodiments, the metal mesh 102 may be made of a material conventional in the art such as, but not limited to, a metal or metal alloy. In a number of embodiments, the metal mesh 102 can at least partially include a metal which may include aluminum, zinc, copper, magnesium, tin, platinum, titanium, tungsten, lead, iron, bronze, alloys thereof, any combination thereof, or may be another type. More particularly, metal mesh 102 can at least partially include a steel, such as a stainless steel or spring steel. For example, the metal mesh 102 can at least partially include a 301 stainless steel. The 301 stainless steel may be annealed, ¼ hard, ½ hard, ¾ hard, or full hard.

In one embodiment, the metal mesh 102 can include an alloy of aluminum with the group consisting of magnesium, calcium, strontium, barium, scandium, titanium, vanadium, manganese, corrosive metal, cobalt, nickel, copper, zinc, gallium, indium, thallium, germanium, tin, lead, and any combination thereof. In one particular embodiment, the metal mesh 102 includes an aluminum magnesium alloy. In yet another embodiment, the metal mesh 102 may consist essentially of an aluminum magnesium alloy. In one embodiment, the aluminum magnesium alloy includes at least about 3 wt % magnesium, such as at least about 3.5 wt % magnesium. In another embodiment, the aluminum magnesium alloy includes not greater than about 10 wt % magnesium, such as not greater than about 9 wt %, not greater than about 8 wt %, not greater than about 7 wt %, or not greater than about 6 wt %. In another embodiment, the aluminum magnesium alloy includes at least about 85 wt % aluminum, such as at least about 90 wt % aluminum. In another embodiment, the aluminum magnesium alloy includes not greater than about 96 wt % aluminum.

The metal mesh 102 may be formed and manufactured according to known techniques in the bearing arts. In a number of embodiments, the filaments 110 of the metal mesh 102 may be woven. The weave may be a plain weave, hopsack weave, poplin weave, taffeta weave, poult-de-soie weave, pibiones weave, grosgrain weave, twill weave (including 2/1 twill, 3/3 twill, 1/2 twill), satin weave, sateen weave, rib weave, matt weave, jacquard weave, leno or gauze weave, pile fabric weave, or may be another type. In certain embodiments, the metal mesh 104 may have a bi-material construction. In a more particular embodiment, the metal mesh 104 may be bi-metallic.

In one embodiment, the metal mesh 102 has a mesh size of at least 10 mesh/inch, such as at least 11 mesh/inch, at least 13 mesh/inch, at least 15 mesh/inch, at least 17 mesh inch, at least 19 mesh/inch, or at least 21 mesh/inch. In another embodiment, the mesh size may not be greater than 30 mesh/inch, such as not greater than 28 mesh/inch, not greater than 26 mesh/inch, not greater than 22 mesh/inch, not greater than 18 mesh/inch, or not greater than 16 mesh/inch.

In yet another embodiment, the metal mesh 102 has a thickness of no less than 0.1 mm, such as no less than 0.5 mm, such as no less than 0.75 mm, such as no less than 1 mm, such as no less than 1.5 mm, such as no less than 2 mm, such as no less than 5 mm. In a number of embodiments, the metal mesh 102 has a thickness of no greater than 10 mm, such as no greater than 7.5 mm, such as no greater than 5 mm. In a number of embodiments, the metal mesh 102 has a thickness of between about 0.1 and about 10 mm.

In a particular embodiment, the metal mesh 102 may comprise a material having a low yield strength. For example, the metal mesh 102 may comprise a material having a yield strength of no greater than 500 MPa, such as no greater than 400 MPa, such as no greater than 300 MPa, such as no greater than 200 MPa, such as no greater than 150 MPa, such as no greater than 100 MPa, or even no greater than 75 MPa. In an embodiment, the metal mesh 102 may comprise a material having a yield strength of at least 5 MPa, such as at least 10 MPa, such as at least 25 MPa, such as at least 40 MPa, at least 45 MPa, such as at least 50 MPa, or even at least 55 MPa. Low yield strength as described above may be desirable in particular embodiments as active deformation of a material having a high yield strength during lamination processes, may result in residual stresses in a finished laminated product. These residual stresses may manifest in delamination or breakage issues over extended usage. To the contrary, lower yield strength manifests in increased plastic deformation and decreased elastic deformation during lamination, thereby reducing the tendency of the metal mesh 102 to spring-back to the pre-laminated state.

In particular embodiments, the metal mesh 102 may be coated with one or more temporary corrosion protection layers 125 to prevent corrosion thereof prior to processing.

Each of the layers can have a thickness in a range of 1 micron and 50 microns, such as in a range of 7 microns and 15 microns. The layers can include a phosphate of zinc, iron, manganese, or any combination thereof. Additionally, the layers can be a nano-ceramic layer. Further, layers can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Temporary corrosion protection layers can be removed or retained during processing.

In particular embodiments, the metal mesh 102 may further include a permanent corrosion resistant coating 127. The corrosion resistant coating 127 can have a thickness of in a range of 1 micron and 50 microns, such as in a range of 5 microns and 20 microns, or even in a range of 7 microns and 15 microns. The corrosion resistant coating 127 can include an adhesion promoter layer 129 and an epoxy layer 131. The adhesion promoter layer 129 can include a phosphate of zinc, iron, manganese, tin, or any combination thereof. Additionally, the adhesion promoter layer 129 can be nano-ceramic layer. The adhesion promoter layer 129 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof.

The epoxy layer 131 can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin can include synthetic resin modified epoxies based on phenolic resins, urea resins, melamine resins, benzoguanamine with formaldehyde, or any combination thereof. By way of example, epoxies can include a formula of $C_XH_YX_ZA_U$ where this formula is a linear or ramified saturated or unsaturated carbon chain with optionally halogen atoms $X_Z$ substituting hydrogen atoms, and optionally where atoms like nitrogen, phosphorous, boron, etc., are present and B is one of carbon, nitrogen, oxygen, phosphorous, boron, sulfur, etc.

The epoxy resin can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_XH_YX_ZA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof. Generally, amines can be primary amines, secondary amines, or tertiary amines conforming to the formula $R_1R_2R_3N$ where R can be $C_XH_YX_ZA_U$ as described above.

In an embodiment, the epoxy layer 131 can include fillers to improve conductivity, such as carbon fillers, carbon fibers, carbon particles, graphite, metallic fillers such as bronze, aluminum, and other metals and their alloys, metal oxide fillers, metal coated carbon fillers, metal coated polymer fillers, or any combination thereof. The conductive fillers can allow current to pass through the epoxy coating and can increase the conductivity of the coated bushing as compared to a coated bushing without conductive fillers.

In an embodiment, the epoxy layer 131 can increase the corrosion resistance of the metal mesh 102. For example, the epoxy layer 131 can substantially prevent corrosive elements, such as water, salts, and the like, from contacting the metal mesh 102, thereby inhibiting chemical corrosion thereof. Additionally, the epoxy layer can inhibit galvanic corrosion of the metal mesh 102 by preventing contact between dissimilar metals. For example, placing an aluminum metal mesh 102 without the epoxy layer against a magnesium material can cause the magnesium to oxidize. However, the epoxy layer can prevent the aluminum metal mesh from contacting the magnesium housing and inhibit corrosion due to a galvanic reaction.

In an embodiment, the epoxy layer 131 can be applied by spray coating, e-coating, dip spin coating, electrostatic coating, flow coating, roll coating, knife coating, coil coating, or the like. Additionally, the epoxy layer can be cured, such as by thermal curing, UV curing, IR curing, electron beam curing, irradiation curing, or any combination thereof. Preferably, the curing can be accomplished without increasing the temperature of the component above the breakdown temperature of any of the sliding layer, the adhesive layer, the woven mesh, or the adhesion promoter layer. Accordingly, the epoxy may be cured below about 250° C., even below about 200° C.

In one embodiment, bearing component 100 may further include a can include an adhesive layer 133 between the metal mesh 102 and the substrate 106. In another embodiment, bearing component 100 can include an adhesive layer 133 between the metal mesh 102 and the sliding layer 104 substrate. In yet another embodiment, the metal mesh 102 can be embedded in an adhesive layer 133. The adhesive layer 133 can include a thermosetting adhesive such as an epoxy, a polyurethane, a cyanoacrylate, acrylic polymers, or a combination thereof. The adhesive layer can also include a melt adhesive or thermoplastic. For example, the adhesive layer can include Ethylene-Vinyl Acetate (EVA), Ethylene vinyl alcohol (EVOH), Fluoroplastics (PTFE, alongside with FEP, PFA, CTFE, ECTFE, ETFE), Ionomers, acrylic/PVC alloy, Liquid Crystal Polymer (LCP), Polyoxymethylene (POM), Polyacrylates (Acrylic), Polyacrylonitrile (PAN), Polyamide (PA), Polyamide-imide (PAI), Polyaryletherketone (PAEK), Polybutadiene (PBD), Polybutylene (PB), Polybutylene terephthalate (PBT), Polycaprolactone (PCL), Polychlorotrifluoroethylene (PCTFE), Polyethylene terephthalate (PET), Polycyclohexylene dimethylene terephthalate (PCT), Polycarbonate (PC), Polyhydroxylkanoates (PHAs), Polyketone (PK), Polyester, Polyethylene (PE), Polyetheretherketone (PEEK), Polyetherketoneketone (PEKK), Polyetherimide (PEI), Polyethersulfone (PES), Chlorinated Polyethylene (CPE), Polyimide (PI), Polylactic acid (PLA), Polymethylpentene (PMP), Polyphenylene oxide (PPO), Polyphenylene sulfide (PPS), Polyphthalamide (PPA), Polypropylene (PP), Polystyrene (PS), Polysulfone (PSU), Polytrimethylene terephthalate (PTT), Polyurethane (PU), Polyvinyl acetate (PVA), Polyvinyl chloride (PVC), Polyvinylidene chloride (PVDC), Styrene-acrylonitrile (SAN), and any combination thereof. In an embodiment, the adhesive layer can be a hot melt adhesive. Examples of suitable adhesives include fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C=O, —C—O—R, —COH, —COOH, —COOR, —CF2=CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C., even higher than 300° C.

The sliding layer 104 may include a sheet of material having a first major surface 104a and a second major surface 104b. The first and second major surfaces 104a and 104b can be spaced apart by a thickness. In an embodiment, the thickness of the sliding layer 104 at a first location along the sheet can be equal to a thickness of the sliding layer 104 at a second location along the sheet. In a more particular embodiment, the major surface 104a can lie along a first plane and the major surface 104b can lie along a second plane; the first and second planes not intersecting at any location therealong. In another embodiment, the sliding layer 102 can have a nonuniform thickness, i.e., a thickness of the sliding layer 104 at a first location may be different from a thickness of the sliding layer 104 at a second location.

In an embodiment, the sliding layer 104 can be continuous, i.e., the sliding layer 104 may be devoid of perceptible apertures or openings extending therethrough. In such a manner, a liquid applied to the sliding layer along one of the major surfaces 104a or 104b will not penetrate through the thickness thereof to the other of the major surfaces 104a or 104b. Skilled artisans will recognize that inherent material porosity resulting from the manufacturing process does not rise to the level of an aperture or opening, unless the porosity is large enough so as to permit permeability of a fluid, such as water, therethrough. The sliding layer 102 may comprise a monolithic construction. In an embodiment, the sliding layer 102 may have an approximately homogenous composition, i.e., the sliding layer 104 essentially includes a single material. In a further embodiment, the sliding layer 104 may have a homogenous composition.

In a number of embodiments, the sliding layer 104 may be a polymer such as a polyketone, a polyaramid, a polyimide, a polytherimide, a polyphenylene sulfide, a polyethersIfone, a polysulfone, a polypheylene sulfone, a polyamideimide, ultra high molecular weight polyethylene, a fluoropolymer, a polyamide, a polybenzimidazole, or any combination thereof. In an example, the sliding layer 104 can at least partially include a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the sliding layer 104 includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the sliding layer 104 includes polyketone, such as polyether ether ketone (PEEK), polyether ketone, polyether ketone ketone, polyether ketone ether ketone, a derivative thereof, or a combination thereof. In an additional example, the low friction/wear resistant layer may be an ultra high molecular weight polyethylene. An example fluoropolymer includes fluorinated ethylene propylene (FEP), polytetrafluoroethylene (PTFE), polyvinylidene fluoride (PVDF), polyvinyl fluoride (PVF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), any combination thereof, or may be another type. The sliding layer 104 may be formed and manufactured according to known techniques in the bearing arts.

In a particular embodiment, the sliding layer 104 may be impregnated or saturated with a filler. Exemplary fillers include glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), liquid crystal polymers (LCP), polyether ether ketones (PEEK) aromatic polyesters (Ekonol), aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. In one embodiment, the sliding layer 104 consists essentially of a fluoropolymer and a filler.

In embodiments, the sliding layer 104 can have a thickness of at least about 0.05 mm, such as at least about 0.1 mm, at least about 0.15 mm, at least about 0.2 mm, at least about 0.25 mm, at least about 0.3 mm, at least about 0.35 mm, at least about 0.4 mm, or at least about 0.45 mm. In other embodiment, the sliding layer 104 has a thickness of not greater than about 5 mm, such as not greater than about 4.5 mm, not greater than about 4 mm, not greater than about 3.5 mm, not greater than about 3 mm, not greater than about 2.5 mm, not greater than about 2 mm, not greater than about 1.5 mm, not greater than about 1 mm, not greater than about 0.5 mm.

In another embodiment, the sliding layer 104 may cover or overlie the metal mesh 102. In a number of embodiments, the sliding layer 104 may have a covering that can include at least about 20%, such as at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 98% of the metal mesh 102. In yet one further embodiment, the covering may not be greater than about 99.9%, such as not greater than about 90% of the metal mesh 102. In a number of embodiments, the sliding layer 104 may impregnate and/or completely surround the metal mesh 102. In a number of embodiments, the metal mesh 102 may be at least partially embedded into the sliding layer 104.

In an embodiment, the metal mesh 102 may be embedded in the sliding layer 104, but extend beyond the sliding layer 104 so as to be partially exposed. The metal mesh 102 can have an exposed thickness, $T_E$, less than a total thickness, T, thereof. For example, $T_E$ can be less than 0.9 T, such as less than 0.85 T, less than 0.8 T, less than 0.75 T, less than 0.7 T, less than 0.65 T, less than 0.6 T, less than 0.55 T, less than 0.5 T, less than 0.45 T, less than 0.4 T, less than 0.35 T, or even less than 0.3 T. In an embodiment, $T_E$ can be at least 0.01 T, such as at least 0.05 T, at least 0.1 T, at least 0.15 T, at least 0.2 T, or even at least 0.25 T. In a particular embodiment, $T_E$ may be between 0.1 and 0.25 T.

The metal mesh 102 may extend into the sliding layer 104 a distance that may be less than a thickness of the sliding layer 104. For example, the metal mesh 102 can extend into the sliding layer at least 1% of a thickness thereof, such as at least 2% the thickness thereof, at least 3% the thickness thereof, at least 4% the thickness thereof, at least 5% the thickness thereof, at least 6% the thickness thereof, at least 7% the thickness thereof, at least 8% the thickness thereof, at least 9% the thickness thereof, at least 10% the thickness thereof, at least 15% the thickness thereof, or even at least 20% the thickness thereof. In an embodiment, the metal mesh 102 may extend into the sliding layer 104 no greater than 95% of the thickness thereof, such as no greater than 90% the thickness thereof, no greater than 85% the thickness thereof, no greater than 80% the thickness thereof, no greater than 75% the thickness thereof, no greater than 70% the thickness thereof, no greater than 65% the thickness thereof, no greater than 60% the thickness thereof, no greater than 55% the thickness thereof, no greater than 50% the thickness thereof, no greater than 45% the thickness thereof, no greater than 40% the thickness thereof, no greater than 35% the thickness thereof, or even no greater than 30% the thickness thereof.

In a number of embodiments, the substrate 106 may be made of a material conventional in the art such as, but not limited to, a metal or metal alloy, a ceramic, a polymer, or a composite material. In a number of embodiments, the substrate 106 can at least partially include a metal which may include aluminum, zinc, copper, magnesium, tin, platinum, titanium, tungsten, lead, iron, bronze, alloys thereof, any combination thereof, or may be another type. More particularly, substrate 106 can at least partially include a steel, such as a stainless steel or spring steel. For example, the substrate 106 can at least partially include a 301 stainless steel. The 301 stainless steel may be annealed, ¼ hard, ½ hard, ¾ hard, or full hard. The substrate 106 may be formed and manufactured according to known techniques in the bearing arts.

Figure 7B:
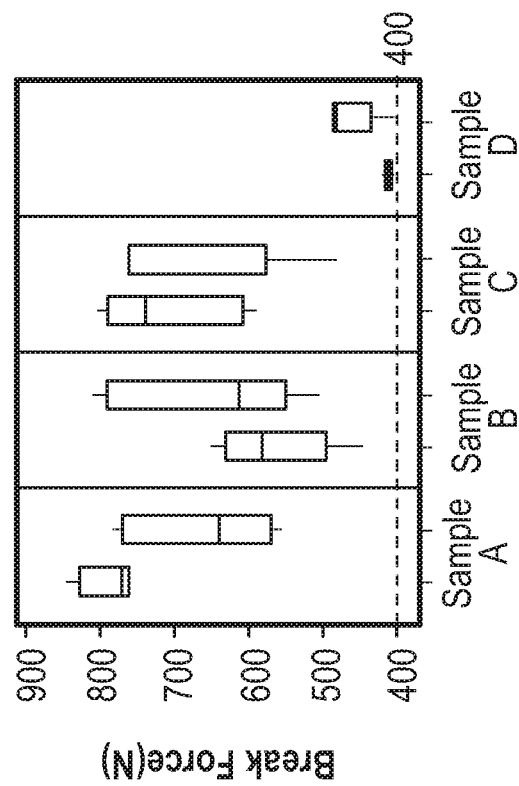
FIG. 7B includes a comparison box and whisker graph of break force of a bearing component according to a number of embodiments.
Figure 7A:
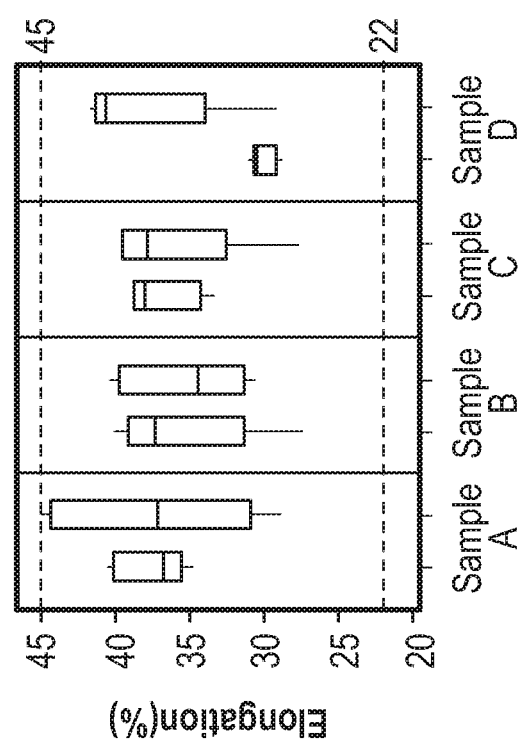
FIG. 7A includes a comparison box and whisker graph of elongation % of a bearing component according to a number of embodiments.

FIG. 7A shows a number of meshes according to a number of embodiments shown herein. Sample A is an example of a mesh 102 having a thickness of 0.35 mm. Sample B is an example of a mesh 102 having a thickness of 0.45 mm. Sample C is an example of a mesh 102 having a thickness of 0.4 mm. Sample D is a prior art mesh.

FIG. 7B shows a number of bearing components 100 according to a number of embodiments shown herein. Sample A is an example of a mesh 102 having a thickness of 0.35 mm. Sample B is an example of a mesh 102 having a thickness of 0.45 mm. Sample C is an example of a mesh 102 having a thickness of 0.4 mm. Sample D is a prior art mesh. As shown, embodiments of the bearing component 100 described herein (Samples A-C) exhibit better break force characteristics relative to the prior art bearing component (Sample D).

In a number of embodiments, the bearing component 100 may have an Elongation % of no greater than 100%, such as no greater than 90%, no greater than 75%, no greater than 50%, no greater than 35%, no greater than 25%, no greater than 10%, no greater than 5%, or even no greater than 1%. In a number of embodiments, the bearing component 100 may have an Elongation % of no less than 0.5%, such as no less than 1%, no less than 5%, no less than 10%, no less than 25%, no less than 50%, or even no less than 75%.

In a number of embodiments, the bearing component 100 may have a Young's modulus of no greater than 200 GPa, such as no greater than 100 GPa, no greater than 50 GPa, no greater than 100 GPa, no greater than 50 GPa, no greater than 25 GPa, no greater than 10 GPa, no greater than 1 GPa, or even no greater than 0.5 GPa. In a number of embodiments, the bearing component 100 may have a Young's modulus of no less than 0.5 GPa, such as no less than 1 GPa, no less than 10 GPa, no less than 25 GPa, no less than 50 GPa, no less than 100 GPa, or even no less than 200 GPa.

Figure 2:
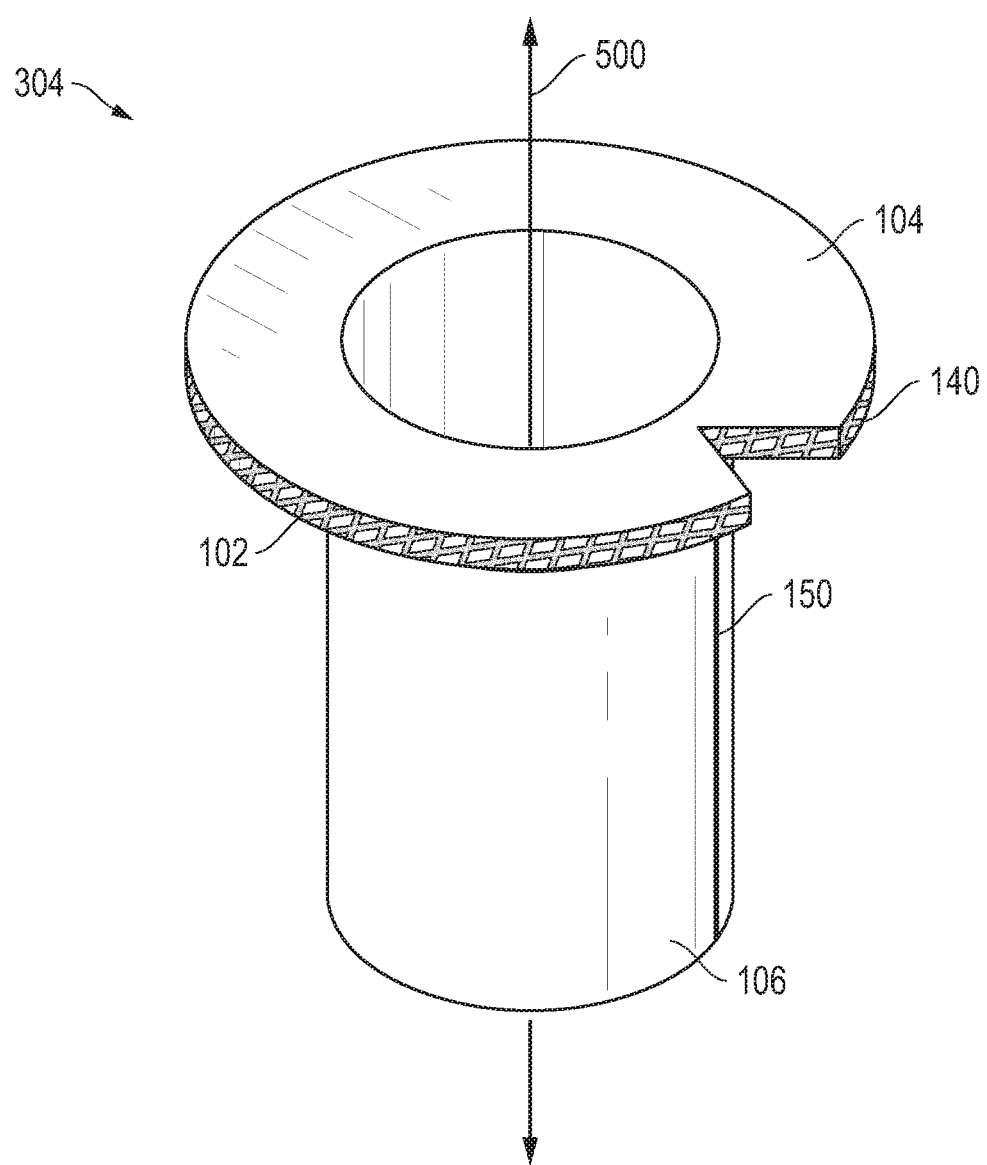
FIG. 2 includes an illustration of a bearing component according to a number of embodiments.

FIG. 2 depicts a bearing component 100 in the form of a bushing 304 with an axis 500. As shown in FIG. 2, the sliding layer 104 defines the internal surface of the bushing which serves the plain bearing function in contact with a rivet of a door hinge, while optional outer layer 106, or in the absence of layer 106, then mesh 102, forms the exterior surface which will be in contact with a hinge part. In a number of embodiments, the bearing component 100 may include a radial flange 140. In a number of embodiments, the bearing component 100 may include an axial gap 150 running down the axis 500 of the bearing component 100.

Figure 3:
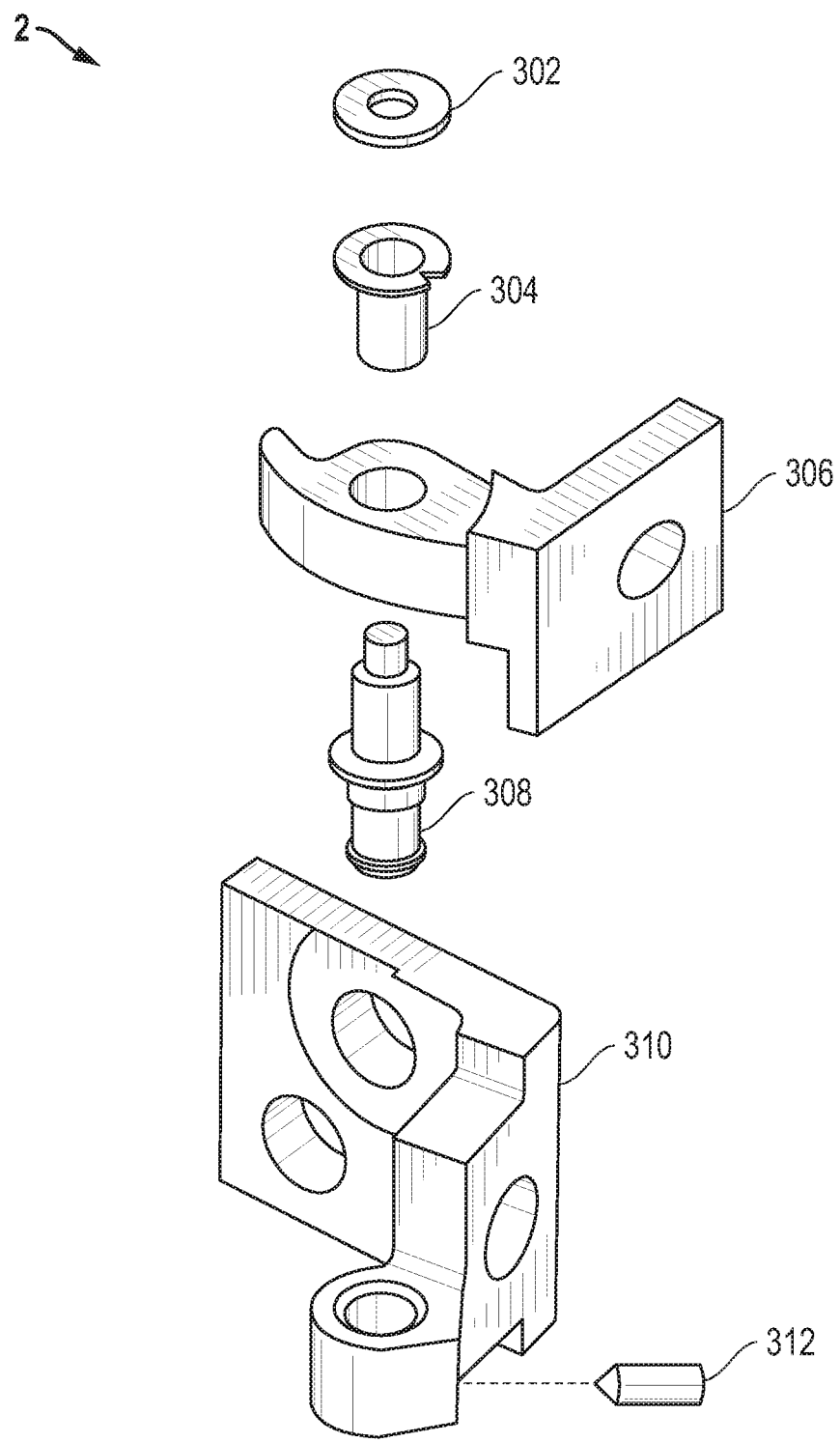
FIG. 3 includes an illustration of automobile door hinge assembly including a bearing component according to a number of embodiments.
Figure 4:
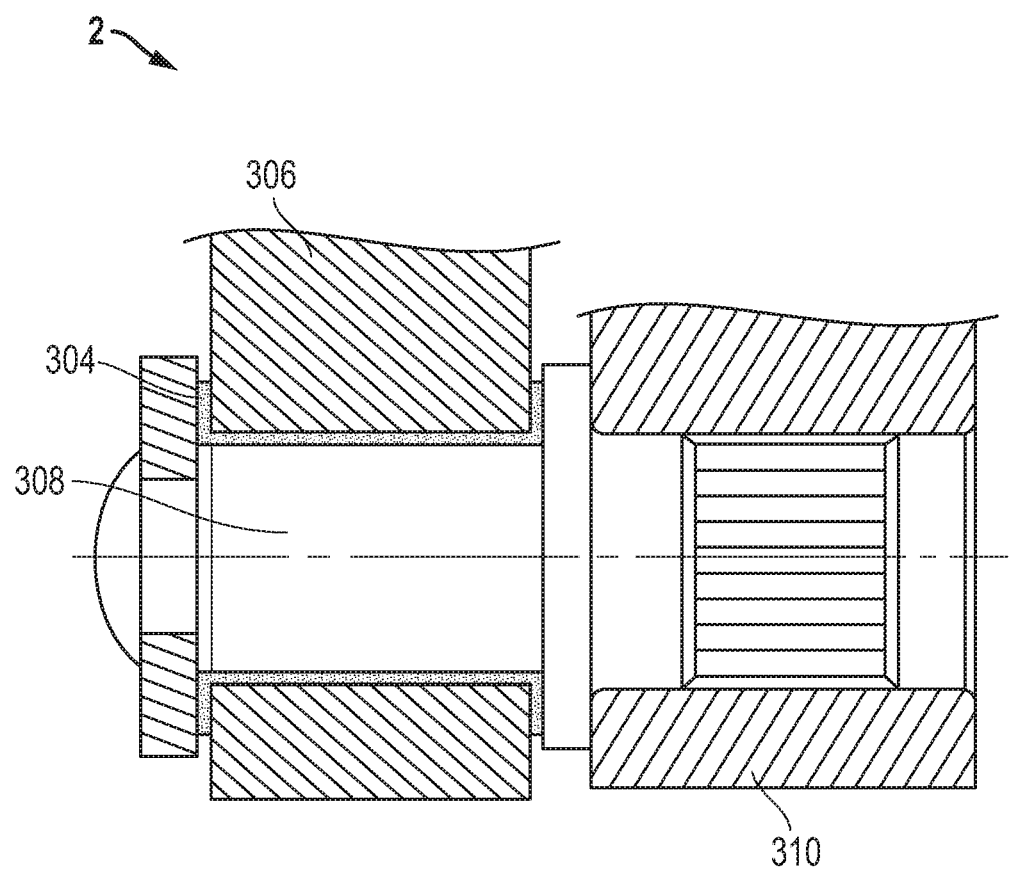
FIG. 4 includes an illustration of a cross-sectional view of an automobile door hinge including a bearing component according to a number of embodiments.
Figure 5:
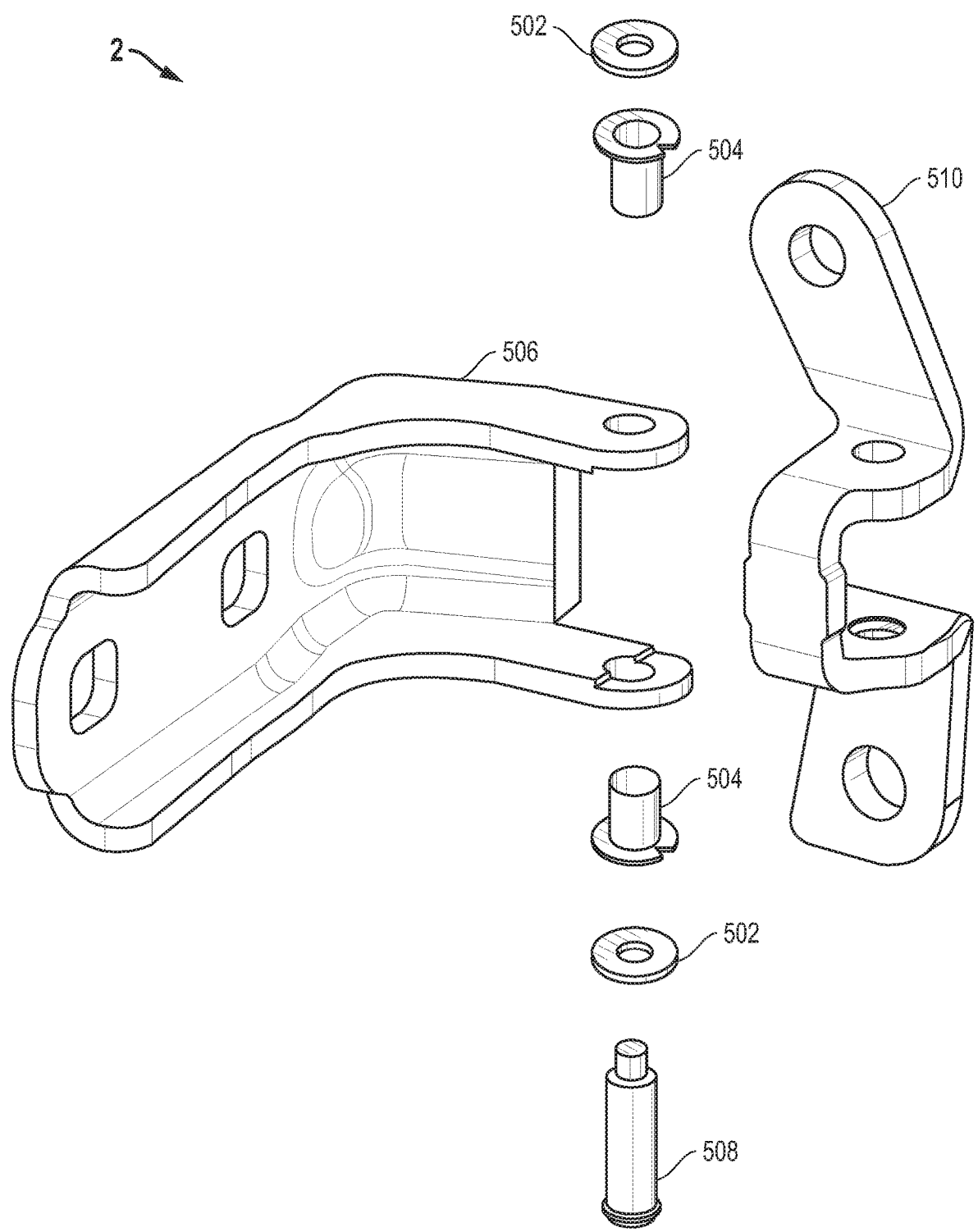
FIG. 5 includes an illustration of another automobile door hinge assembly including a bearing component according to a number of embodiments.

In an embodiment, as shown in FIGS. 3-5, a bearing component 100 may in the form of a bushing 304 within a bearing assembly 2. The bushing or bearing component 100 can have a non-planar shape. The bushing can further be shaped to enfold an inner member and/or an outer member. At least one of the inner member or the outer member can have a non-planar surface. In a number of embodiments, the bearing component 100 can be shaped complementary to one of the inner member or the outer member. The bushing or bearing component 100 can include a metal mesh 102 having a first major surface 102a and a second major surface 102b. The bushing or bearing component 100 can further include a sliding layer 104 overlying the first major surface 102a. The sliding layer 104 can be in direct contact with the metal mesh 102. In a number of embodiments, the bearing component 100 may be a part of a bearing assembly 2. The bearing assembly 2 can include an inner member, an outer member, and the bearing component 100.

In another embodiment, the bushing can be shaped complementary to at least one of the inner member or the outer member. In yet another embodiment, the bushing can be engaged with at least one of the inner member or the outer member and the second major surface of the metal mesh 102 may be in direct contact with the non-planar surface of at least one of the inner member or the outer member. In a number of embodiments, at least one of the inner member or the outer member can include a corrosive metal. In a number of embodiments, at least one of the inner member or the outer member can include steel.

In a number of embodiments, at least one of the inner member or the outer member can include a vehicle part, a machine part, a building element, or a construction piece. In one particular embodiment, the vehicle part may be a hinge assembly such as a vehicle door or tailgate assembly.

FIG. 3 depicts a bearing assembly 2 in the form of the parts of a disassembled automobile door hinge including bushing 304, which comprises the plain bearing material including the laminate of a metal mesh 102 and a sliding layer 104, as depicted in FIG. 2. Bushing 304 may be inserted in a hinge door part or outer member 306. The bearing assembly 2 may further include a rivet or inner member 308 bridging the hinge door part 306 with hinge body part 310. Rivet 308 may be tightened with hinge body part 310 through set screw 312 and hold in place with the hinge door part 306 through washer 302.

FIG. 4 depicts a cross-sectional view of a bearing assembly 2 in the form of the assembled door hinge. Points of highest corrosion occur where at the interface of the rivet 308 and the hinge door part 306, since there is the greatest friction between the parts.

FIG. 5 depicts a bearing assembly 2 in the form of the parts of a disassembled automobile door hinge according to another embodiment. This door hinge assembly includes two bushings 504 which comprise plain bearing material having a metal mesh 102 and a sliding layer 104, as depicted in FIG. 2. Bushings 504 may be inserted in a hinge door part or outer member 506. The bearing assembly 2 may further include a rivet or inner member 508 bridging the hinge door part 506 with hinge body part 510. Rivet 508 may be tightened with hinge body part 510 and hold in place with the hinge door part 506 through washers 502.

Figure 6A:
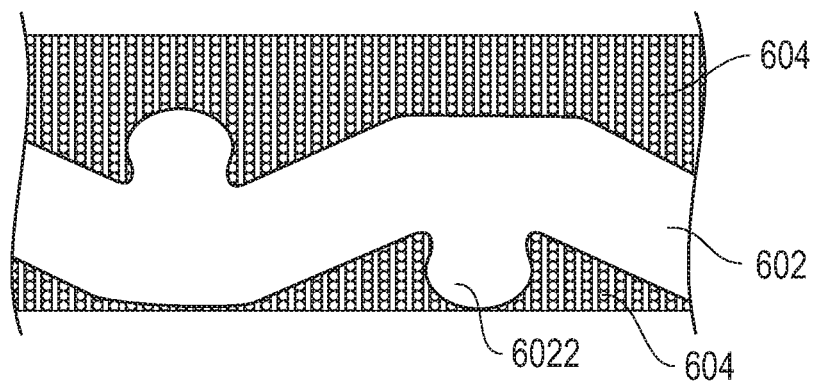
FIG. 6A includes a line diagram of cross-sectional SEM pictures of a bearing component according to a number of embodiments.
Figure 6B:
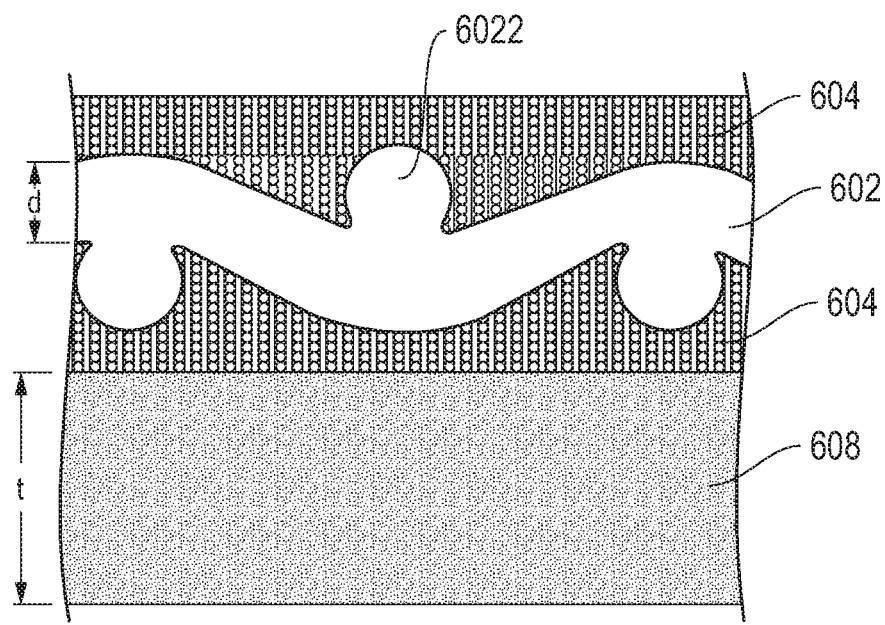
FIG. 6B includes a line diagram of cross-sectional SEM pictures of a bearing component according to a number of embodiments.

FIG. 6A depicts a line diagram of an SEM picture of an aluminum alloy mesh 602 calendared or embedded into sliding material 604. FIG. 6B depicts an aluminum alloy mesh 602 with filaments 6022 running orthogonal to the plane calendared or embedded in sliding material 604 and laminated on a metal support 608. The mesh thickness 'd' can be at least about 0.1 mm, such as at least about 0.2 mm, at least about 0.3 mm, at least about 0.4 mm, at least about 0.5 mm, or at least about 0.6 mm. In another embodiment the mesh thickness 'd' may not be greater than about 0.8 mm, such as not greater than about 0.6 mm, not greater than about 0.5 mm, or not greater than about 0.4 mm. In this particular example, d may be about 0.15 mm±0.02 mm. The metal support can have a thickness 't' of at least about 0.1 mm, such as at least about 0.2 mm, at least about 0.3 mm, at least about 0.4 mm, at least about 0.5 mm, or at least about 0.6 mm. In another embodiment the metal support thickness T may not be greater than about 1.0 mm, such as not greater than about 0.8 mm, not greater than about 0.6 mm, not greater than about 0.5 mm, or not greater than about 0.4 mm.

In another embodiment, a method may be provided including: providing a substrate 106, overlying the substrate with a metal mesh 102 comprising filaments 112 having a woven structure such that the filaments 112 overlap each other at intersections, wherein a plurality of intersections 120 include a first filament 112a overlying a second filament 112b; cold rolling the metal mesh 112 to mechanically deform at least one of the first filament 112a or the second filament 112b to provide at least one intersection 120 where the first filament 112a wraps around the second filament 112b by at least 180 degrees and interlocks therewith; and applying a sliding layer 104 to the metal mesh 102 to form a bearing component 100. The method may further include forming the bearing component 100 into a non-planar shape. The step of forming the bearing component 100 into a non-planar shape may include forming the bearing component 100 into a cylindrical shape having a radial flange 140.

In a number of embodiments, the bearing component as described herein may provide fewer or even eliminate loose filaments or burrs on edges of the bearing component. Further, embodiments of the bearing component may provide improved strength, stiffness, and better elongation % performance. Further, embodiments of the bearing component may provide more efficient and faster production, and improved sizeablility. Further, embodiments of the bearing component may provide less torque loss and less torque variation after sizing versus previous bearing components. Further, embodiments of the bearing component may provide improved corrosion protection.

Note that not all of the activities described above in the general description or the examples are required, that a portion of a specific activity may not be required, and that one or more further activities may be performed in addition to those described. Still further, the order in which activities are listed are not necessarily the order in which they are performed.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A bearing component comprising: a substrate; a sliding layer overlying the substrate; and a metal mesh comprising filaments embedded in the sliding layer, the metal mesh having a woven structure such that the filaments overlap each other at intersections, wherein a plurality of intersections include a first filament overlying a second filament, the first filament being mechanically deformed so as to interlock with the second filament.

Embodiment 2

A bearing assembly comprising: an inner member; an outer member; and a bearing component comprising: a substrate; a sliding layer overlying the substrate; and a metal mesh comprising filaments embedded in the sliding layer, the metal mesh having a woven structure such that the filaments overlap each other at intersections, wherein a plurality of intersections include a first filament overlying a second filament, the first filament being mechanically deformed so as to interlock with the second filament.

Embodiment 3

A method comprising: providing a substrate; overlying the substrate with a metal mesh comprising filaments having a woven structure such that the filaments overlap each other at intersections, wherein a plurality of intersections include a first filament overlying a second filament; cold rolling the metal mesh to mechanically deform at least one of the first filament or the second filament to provide at least one intersection where the first filament wraps around the second filament; and applying a sliding layer to the metal mesh to form a bearing component.

Embodiment 4

The bearing component, bearing assembly, or method of any of the preceding embodiments, wherein at least one of the first filament or the second filament has at least one flattened section at the at least one intersection.

Embodiment 5

The bearing component, bearing assembly, or method of embodiment 4, wherein the at least one flattened section comprises two flattened sections that are substantially parallel to each other at the at least one intersection.

Embodiment 6

The bearing component, bearing assembly, or method of any of the preceding embodiments wherein the first filament wraps around the second filament by at least 90°, such as at least 120°, at least 150°, at least 180°, at least 210°, at least 240°, at least 270°, or at least 300°.

Embodiment 7

The bearing component, bearing assembly, or method of any of the preceding embodiments wherein the first filament wraps around the second filament no greater than 300°, such as no greater than 270°, no greater than 240°, or no greater than 210°, no greater than 180°, no greater than 150°, no greater than 120°, or no greater than 90°.

Embodiment 8

The bearing component, bearing assembly, or method of any of the preceding embodiments, wherein the substrate comprises a metal comprising aluminum, bronze, iron, tin, platinum, titanium, or an alloy thereof.

Embodiment 9

The bearing component, bearing assembly, or method of any of the preceding embodiments, wherein the metal mesh comprises a metal comprising aluminum, bronze, iron, tin, platinum, titanium, or an alloy thereof.

Embodiment 10

The bearing component, bearing assembly, or method of any of the preceding embodiments, wherein the sliding layer comprises a fluoropolymer.

Embodiment 11

The bearing component, bearing assembly, or method according to embodiment 10, wherein the fluoropolymer is selected from the group consisting of polychlorotrifluoroethylene (PCTFE), polytetrafluoroethylene (PTFE), tetrafluoroethylene-perfluoro(alkyl vinyl ether) copolymer (PFA), tetrafluoroethylene-hexafluoropropylene copolymer (FEP), tetrafluoroethylene-ethylene copolymer (ETFE), polyvinylidene fluoride (PVDF) and polyvinyl fluoride (PVF), and a laminated film comprising two or more thereof.

Embodiment 12

The bearing component, bearing assembly, or method of any of the preceding embodiments, wherein the sliding layer further comprises a filler selected from fibers, glass fibers, carbon fibers, aramids, inorganic materials, ceramic materials, carbon, glass, graphite, aluminum oxide, molybdenum sulfide, bronze, silicon carbide, woven fabrics, powders, spheres, thermoplastic materials, polyimide (PI), polyamidimide (PAI), polyphenylene sulfide (PPS), polyphenylene sulfone (PPSO2), liquid crystal polymers (LCP), polyether ether ketones (PEEK) aromatic polyesters (Ekonol), mineral materials, wollastonite, barium sulfate, or any combination thereof.

Embodiment 13

The bearing component, bearing assembly, or method of any of the preceding embodiments, wherein the metal mesh comprises at least one aperture extending through a thickness of the metal mesh Embodiment 14

The bearing component or bearing assembly of any of the preceding embodiments, wherein the bearing component has a non-planar shape.

Embodiment 15

The bearing assembly of any of embodiments 2 and 4-14, wherein the bearing component is shaped complementary to one of the inner member or the outer member.

Embodiment 16

The bearing component, bearing assembly, or method of any of the preceding embodiments, wherein the bearing component comprises an axial gap.

Embodiment 17

The bearing component or bearing assembly of any of the preceding embodiments, wherein the bearing component comprises a radial flange.

Embodiment 18

The bearing component, bearing assembly, or method of any of the preceding embodiments, wherein the bearing component has an Elongation % of between about 30 and about 45.

Embodiment 19

The bearing component, bearing assembly, or method of any of the preceding embodiments, wherein the bearing component has a break force of between about 500 to about 850 N.

Embodiment 20

The bearing component, bearing assembly, or method of any of the preceding embodiments, wherein at least one filament has a filament thickness of between about 0.1 and about 10 mm.

Embodiment 21

The method of embodiment 3, further comprising forming the bearing component into a non-planar shape.

Embodiment 22

The method of embodiment 21, wherein the forming the bearing component into a non-planar shape step comprises forming the bearing component into a cylindrical shape having a radial flange.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A bearing component comprising:
   a substrate;
   a sliding layer overlying the substrate; and
   a metal mesh comprising filaments embedded in the sliding layer, the metal mesh having a woven structure such that the filaments overlap each other at intersections, wherein a plurality of intersections include a first filament overlying a second filament, the first filament being mechanically deformed so as to interlock with the second filament.

2. The bearing component of claim 1, wherein at least one of the first filament or the second filament has at least one flattened section at the at least one intersection.

3. The bearing component of claim 1, wherein the first filament wraps around the second filament by at least 90°.

4. The bearing component of claim 1, wherein the first filament wraps around the second filament no greater than 300°.

5. The bearing component of claim 1, wherein the substrate comprises a metal comprising aluminum, bronze, iron, tin, platinum, titanium, or an alloy thereof.

6. The bearing component of claim 1, wherein the metal mesh comprises a metal comprising aluminum, bronze, iron, tin, platinum, titanium, or an alloy thereof.

7. The bearing component of claim 1, wherein the sliding layer comprises a fluoropolymer.

8. The bearing component of claim 7, wherein the fluoropolymer is selected from the group consisting of polychlorotrifluoroethylene (PCTFE), polytetrafluoroethylene (PTFE), tetrafluoroethylene-perfluoro(alkyl vinyl ether) copolymer (PFA), tetrafluoroethylene-hexafluoropropylene copolymer (FEP), tetrafluoroethylene-ethylene copolymer (ETFE), polyvinylidene fluoride (PVDF) and polyvinyl fluoride (PVF), and a laminated film comprising two or more thereof.

9. The bearing component of claim 1, wherein the sliding layer further comprises a filler selected from fibers, glass fibers, carbon fibers, aramids, inorganic materials, ceramic materials, carbon, glass, graphite, aluminum oxide, molybdenum sulfide, bronze, silicon carbide, woven fabrics, powders, spheres, thermoplastic materials, polyimide (PI), polyamidimide (PAI), polyphenylene sulfide (PPS), polyphenylene sulfone (PPSO2), liquid crystal polymers (LCP), polyether ether ketones (PEEK) aromatic polyesters (Ekonol), mineral materials, wollastonite, barium sulfate, or any combination thereof.

10. The bearing component of claim 1, wherein the metal mesh comprises at least one aperture extending through a thickness of the metal mesh.

11. The bearing component of claim 1, wherein the bearing component comprises an axial gap.

12. The bearing component of claim 1, wherein the bearing component comprises a radial flange.

13. The bearing component of claim 1, wherein the bearing component has an Elongation % of between about 30 and about 45.

14. The bearing component of claim 1, wherein the bearing component has a break force of between about 500 to about 850 N.

15. The bearing component of claim 1, wherein at least one filament has a filament thickness of between about 0.1 and about 10 mm.

16. A bearing assembly comprising:
    an inner member;
    an outer member; and
    a bearing component comprising:
      a substrate;
      a sliding layer overlying the substrate; and
      a metal mesh comprising filaments embedded in the sliding layer, the metal mesh having a woven structure such that the filaments overlap each other at intersections, wherein a plurality of intersections include a first filament overlying a second filament, the first filament being mechanically deformed so as to interlock with the second filament.

17. The bearing assembly of claim 16, wherein the bearing component is shaped complementary to one of the inner member or the outer member.

18. A method comprising:
    providing a substrate;
    overlying the substrate with a metal mesh comprising filaments having a woven structure such that the filaments overlap each other at intersections, wherein a plurality of intersections include a first filament overlying a second filament;
    cold rolling the metal mesh to mechanically deform at least one of the first filament or the second filament to provide at least one intersection where the first filament wraps around the second filament; and
    applying a sliding layer to the metal mesh to form a bearing component.

19. The method of claim 18, further comprising forming the bearing component into a non-planar shape.

20. The method of claim 18, wherein the forming the bearing component into a non-planar shape step comprises forming the bearing component into a cylindrical shape having a radial flange.

* * * * *